NOR SHIFT REGISTER

Filed April 29, 1963

WITNESSES
Theodore F. Wrobel
James F. Young

INVENTOR
Terry A. Jeeves
BY M. J. Brodahl
ATTORNEY 3,195,053
Patented July 13, 1965

3,195,053

NOR SHIFT REGISTER

Terry A. Jeeves, Penn Hills Township, Allegheny County, Pa., assignor to Westinghouse Electric Corporation, East Pittsburgh, Pa., a corporation of Pennsylvania Filed Apr. 29, 1963, Ser. No. 276,248
5 Claims. (Cl. 328—37)

The present invention relates to computer logic components, and more particularly to shift register logic components.

Shift registers constitute a major hardware component of serial type computers. At present, commonly used shift registers require at least 8 logic elements per stage for one way shifting, left or right, and require at least 10 logic elements per stage for shifting in both directions, left and right. Because of the large number of shift registers required in many applications, any reduction in number of logic elements required would bring about a substantial reduction in cost. Moreover, the reduction in the number of elements would result in an exponential increase in the reliability of the computer.

It is therefore an object of the present invention to provide a new and improved shift register logic component having an economical design.

It is a further object of the present invention to provide a new and improved shift register logic component requiring a minimum number of elements and providing high reliability.

The present invention, broadly, accomplishes the above-named objects by providing a shift register in which only four logic elements per stage are required, being interconnected and then controlled by clock pulses so that information may be transferred through the stage in either direction.

These and other objects will become more apparent when considered in view of the following specification and drawing, in which.

The well known NOR binary logic function is one in which an output signal from the element is provided only if no input signal is provided at a first input, nor at a second input, nor to any input of the element. For example, a binary ONE output signal will be provided only in the case that each of the inputs to the NOR element has a binary ZERO value. To say in another way, a ZERO output signal will be provided by the NOR element if a ONE signal is applied at any of its inputs.

Figure 1:
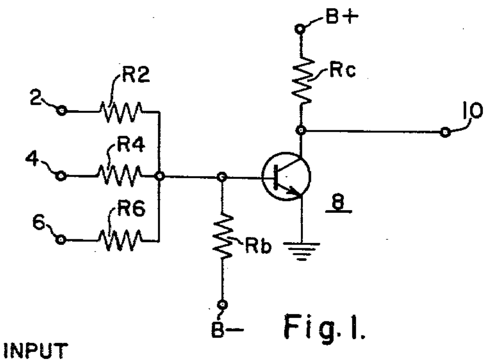
FIGURE 1 is a schematic diagram of a NOR logic circuit.

Referring to FIG. 1, a circuit which will perform the NOR logic function is shown. Input information in binary number 4, a ONE or a ZERO signal, is applied to the terminals 2, 4 and 6. This information is applied to the base of the transistor 8 through the current limiting resistors R2, R4 and R6. The emitter of the transistor 8 is grounded. The collector of the transistor is biased to a positive potential through the resistor R*c* from a source of positive potential B+, not shown. The base of the transistor is biased to a negative potential through the resistor R*b* from a source of negative potential B—, not shown. The output signals for the element are taken from the terminal 10, which is connected to the collector of the transistor 8. Thus, if ZERO input signals, that is, signals which are at ground potential, for example, are applied to the input terminals 2, 4 and 6 the transistor will be in its non-conducting, unsaturated state. A positive voltage then will appear at the terminal 10 to ground, which may be taken as a ONE binary value. However, if a ONE signal, which may be taken as a positive voltage value, is applied to any of the input terminals 2, 4 or 6, this signal being applied to the base of the transistor 8 will switch the transistor to its conductive, saturated state. In this state, the collector of the transistor 8 will be at substantially ground potential so that a ZERO or ground potential signal will appear at the terminal 10.

Figure 2:
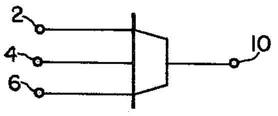
FIG. 2 is a symbolic diagram of a NOR logic element.

FIG. 2 is a symbolic diagram of a NOR circuit, and is shown having the input terminals 2, 4 and 6 and the output terminal 10, which correspond to the input and output terminals of FIG. 1. This symbolic circuit will be used in the discussion of the shift register as presented herein and performs the same function as the circuitry of FIG. 1.

Figure 3:
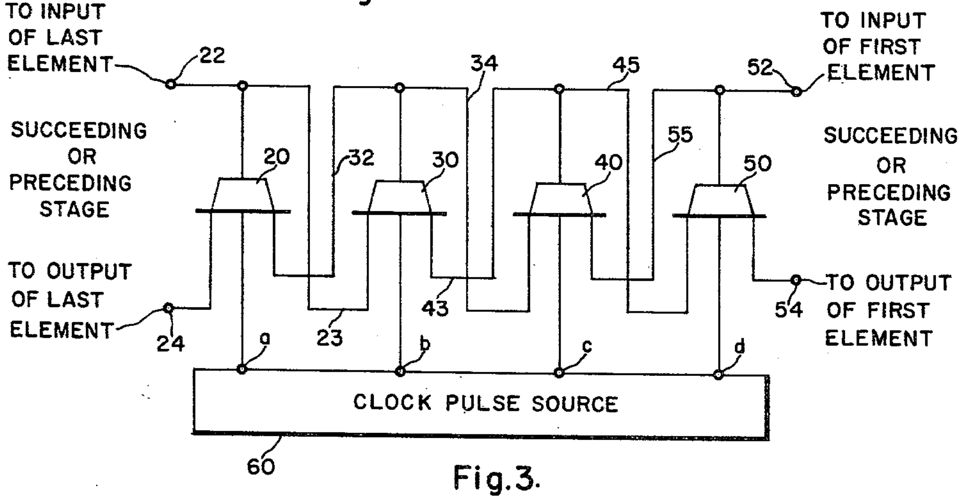
FIG. 3 is a block-schematic diagram of the shift register logic component of the present invention.

Referring now to FIG. 3, a shift register logic component for single stage is shown having four NOR elements connected in what will be herein called a flip-flop chain. The stage shown of the shift register includes the four NOR logic elements 20, 30, 40 and 50. These NOR logic elements are interconnected so that each element receives as input signals the output signal from the next preceding and next succeeding NOR logic element. Also, the output of each element is supplied as an input signal to the next preceding and next succeeding element of the flip-flop chain. Therefore, NOR element 30 has an input connection 23 and 43 for the outputs of the elements 20 and 40, respectively. There are connections 32 and 34 between the output of the element 30 and the inputs of elements 20 and 40, respectively. The element 20 supplies output signals from the terminal 22 to the input of the fourth NOR element of a preceding shift register stage, while receiving as input signals at the terminal 24 from the output of the fourth NOR element of a preceding shift register stage. The NOR logic element 50 provides output signals at the terminal 52 which are applied as input signals to the first NOR logic element of a succeeding NOR shifter stage. Input signals are applied to the terminal 54 from the output of the first NOR element of a succeeding shifter stage. The NOR element 50 receives as input signals the output signal from the element 40 through the connection 45. Output signals from the element 50 are provided to the element 40 as input signals through the connection 55. A clock pulse source 60 having outputs *a*, *b*, *c* and *d* connected to the logic elements 20, 30, 40 and 50, respectively, is provided to supply the wave forms of FIGS. 4A and 4B.

Figure 4A:
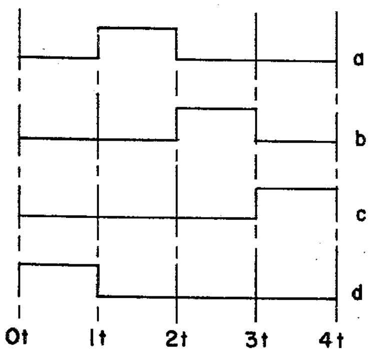
FIG. 4A is a wave form diagram for providing shifting from left to right.
Figure 4B:
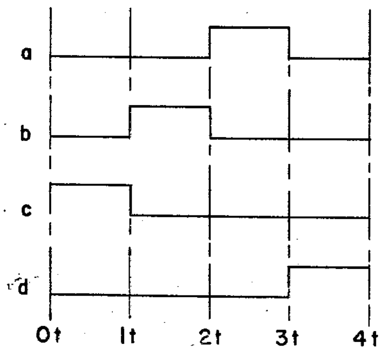
FIG. 4B is a wave form diagram for providing shifting from right to left.

To explain the operation of FIG. 3, reference will also be made to FIG. 4A and FIG. 4B which show the wave forms applied at the outputs *a*, *b*, *c* and *d* of the clock pulse source 60 as a function of time. A complete cycle of operation for the shift register stage is $4t$, where $t$ is the element response time, which is defined to be equal to be the sum of the whole-storage time and the fall time of the transistor logic circuit, as for example shown in FIG. 1.

The left-to-right operation of the shift register will first be described, with the wave forms of FIG. 4A being utilized. Assume initially, at time 0*t* that information is available in the NOR elements 20 and 30, and that the third element 40 is in a saturated or ZERO output state. During the first time interval, 0*t* to 1*t*, the fourth element 40 will assume the same state, saturated-ZERO output or unsaturated-ONE output, as the first element 20. This can be seen, in that: if it is assumed that element 20 provides a ZERO output signal, then element 30 will provide a ONE output signal since the output of element 20 is connected to an input of element 30. Element 30 will then provide a ONE output signal to the element 40, which will maintain the element 40 in saturated, ZERO output state. It should be noted that since the element 40 provides a ZERO output, it will not affect the ONE output signal from the third element 30 even though the output of element 40 is connected to the input of the element 30. Also, the element 30 having a ONE output signal will maintain the element 20 in its saturated, ZERO output state by applying a ONE signal to the input of the element 20. Therefore, both the first element 20 and the third element 40 are in the ZERO state. On the other hand, if during the time interval, 0*t* to 1*t*, the element 20 is assumed to be in its ONE, unsaturated state, the state of element 30 will be in a saturated, ZERO state having a ZERO output However, since during the same time interval, 0*t* to 1*t*, a clock pulse signal is being applied from the output *d* of the clock pulse source 60 to the input of the element 50, this element is then in a saturated ZERO output state. Thus the element 40 receives a ZERO input signal from the output of the element 50. Since element 30 is also in its ZERO output state, no input signals will be applied to the element 40, thus it also will be in its ONE output state which corresponds to the state of the element 20. Therefore, the state of the third element 40 will follow the state of the first element 20 regardless of the initial state of the element 20.

During the second time interval, from 1*t* to 2*t*, a clock pulse will be applied from the output *a* of the clock pulse source 60 to the first logic element 20 so driving the element 20 to its ZERO output stage. It can then be seen that the fourth element 50 will follow the state of the second element 30 to assume the state as the second element 30. So first assuming, the second element 30 is in a no output state then a ZERO signal would be applied to the third element 40. A ONE signal will then be applied to the input of the fourth element 50 prohibiting this element from coming out of saturation maintaining it in its ZERO output state. Thus, both the second element 30 and the fourth element 50 have the same ZERO output state. However, if on the other hand, the element 30 is in a ONE output state during this period, a ONE output signal will be applied to the third element 40 which would cause this element to have a ZERO output. Since the clock pulse applied to the element 50 ended at the time 1*t*, no input signal would be applied to any input of the fourth element 50; thus permitting it to assume a ONE output state and so correspond to the state of the second element 30. From the preceding analysis it can be seen that the fourth element 50 will follow the state of the second element 30.

During the next time interval, 2*t* to 3*t*, it is necessary that information present in the third element 40 of the shift register be transferred to the first element of the succeeding shift register stage, and that information be transferred into the first element 20 from a preceding shift register stage. So assuming that the third stage 40 is in a ZERO output state during the preceding time period, 1*t* to 2*t*, the application of a clock pulse from source 60, output terminal *b* to the second element 30 will cause the element 30 to provide a ZERO output signal to the input of the third element 40 so not affecting its ZERO output state. The fourth element 50 will have a ONE output state under these conditions and will so apply a ONE output signal to the input of the first element of the succeeding state to cause this element to have a ZERO output signal and so correspond to the third element 40 of the shift register. On the other hand, if the state of the third element 40 is such to have a ONE output signal, the second element 30, due to the clock pulse will provide no input signal to the third element 40 and so will not change its state. Since the element 50, with a ONE signal being applied from the third element 40, will be in a ZERO output state, no input signal will be applied to the first element of the succeeding stage so that the first element may assume a ONE output condition corresponding to the state of the third element of the shown stage.

Since the second element 30 provides a ZERO input signal during the time period 2*t* to 3*t* and since the first element 20 no longer has clock pulse applied thereto after the time 2*t*, the first element 20 is free to assume the state of the input signal of the fourth element of the preceding state which would be applied through terminal 24 of the first element 20. Therefore, if a ONE signal is applied to terminal 24, the first element 20 will assume a ZERO output state, and, conversely, if a ZERO output signal is applied to the terminal 24 the first element 20 will assume a ONE output state. It should be noted that the incoming information from the preceding state will thus cause the element 20 to assume the same output state as the third element of the preceding state.

The information transfer for the shown stage is completed during the fourth response time interval, from 3*t* to 4*t*, when both the elements 20 and 30 have received information from the preceding stage of the information transfer. At the time 3*t*, a clock pulse from the output *c* of the source 60 is applied to the third element 40. The second element 30 may come out of saturation as the clock pulse applied thereto ends at time 3*t*. During the response time interval 3*t* to 4*t* the third element 40 will have a ZERO output. Since the second element 30 will have ZERO input signals applied from the output *b* of the source 60 and also from the output of third element 40, the second element 30 will assume the opposite or complement state of the first element 20, that is, the same state as the last element of the preceding shift register stage. In other words, if the last element of the preceding stage has a ONE output signal the first element 20 will have a ZERO output signal so that the second element 30 will have a ONE output signal corresponding to that of the fourth element of the preceding stage. On the other hand, if the fourth element of the preceding stage has a ZERO output stage, the first element 20 will have a ONE output stage which will cause the second element 30 to have a ZERO output stage.

The second element of the succeeding stage will also assume the same state as the fourth element 50. If the fourth element 50 has a ONE output signal, the first element of the succeeding stage will have a ZERO output signal so that the second element of succeeding state will then assume a ONE output signal to correspond to the ONE output state of the fourth element 50. On the other hand, if the fourth element 50 has a ZERO output, the first element of the succeeding stage will assume a ONE output state, with the second element then assuming a ZERO output state corresponding to the ZERO output state of fourth element 50.

All of the foregoing discussions assume that clock pulses are provided to the respective elements of preceding and succeeding shift register stages as are provided to the stage shown.

The cycle of operation of the shift register is thus completed, with information appearing at the time 0*t* in the first element 20 and the second element 30 being transferred to a succeeding stage while new information being now present at the time 4*t* in the elements 20 and 30. The total cycle of operation is $4t$. Moreover, because of lighter loading of the transistors used in the NOR elements in the present shift register design, it is possible to use faster NOR circuits resulting in faster overall shift register operation.

The shift register of FIG. 3 may be shifted from right to left by applying the clock pulses as shown in FIG. 4B. Since the operation of the shift register is symmetrical, the shifting of information from right to left will be only described in relation to transferring the information from the first and second elements 20 and 30, of the stage shown to the third and fourth elements, respectively, of the succeeding stage. It should be understood that the succeeding stage in right to left was the preceding stage in the left to right example.

Assume that it is desired to transfer information from right to left which appears initially in elements 20 and 30. Thus, at time $0t$ a clock pulse is applied from the output $c$ to the third element 40, which saturates this element so that it provides a ZERO signal to the second element 30. It is desired to transfer the information then appearing in the second element 30 to the fourth element of the succeeding stage. So assuming that the output state of the element 38 is a ONE, the application of a ZERO output signal from the element 40 will not affect this output. Thus, a ONE signal will be applied to the element 20 which will then have a ZERO output applied to the input of the fourth element of the succeeding stage so that this element may assume a ONE output state to correspond to the state of the element 30. On the other hand, if, during the timer interval $0t$ to $1t$, the element 30 has a ZERO output state, a ZERO signal will be applied to the element 20 which will not affect its output state, but will provide a ONE output signal which will be applied to the fourth element of the succeeding stage to cause this element to change to have a ZERO output signal corresponding to the ZERO output signal of the second element 30.

During the next response time period, from $1t$ to $2t$, the information appearing in the first element 20 is transferred to the third element of a succeeding stage. During the second time period, a clock pulse is applied from terminal $b$ of the clock pulse 60 to the second element 30; thus causing this element to provide a ZERO output signal to the first element 20. If it is assumed that the first element 20 has a ONE output signal, this will cause the fourth element of the succeeding stage to have a ZERO output signal, which, in turn, in the flip-flop operation of the registers causes the third element to have a ONE output signal corresponding to that of the first element 20. Conversely, if the first element 20 has a ZERO output state, the last element of the succeeding stage will have a ONE output state; so the third element of the succeeding stage will have a ZERO output state to correspond to that of the first element 20.

It can thus be seen by this example that information is transferred during the first two time elements of the cycle from the second and first elements 30 and 20 to the fourth and third elements of the succeeding state, respectively by the application of the pulses as shown in FIG. 4B. The cycle of information transfer is completed by shifting information from a preceding stage into the first and second elements of the stage shown. This transfer is accomplished by the application of the clock pulse during the third time period $2t$ to $3t$ to the first element 20 from the terminal $a$ of the clock pulse source 60, and by applying a pulse from the output $d$ to the fourth element 50 during the fourth time period $3t$ to $4t$.

It should be noted as a generalization in either direction shifting—from left to right or vice versa—that the clock pulse is applied to the element next preceding the element from which information is being transferred during that response time period. So, for example, when information is being transferred from the second element of the chain in the right-to-left direction, a clock pulse is applied to the third element of the chain. When it is desired to shift information from left to right from the second element of the chain, a clock pulse would be provided to the first element of the chain. Or, to say this in another manner, the preceding element, in the direction of information flow, is saturated so that the element from which information is desired to be transmitted is free to transmit information along the chain.

Although the present invention has been described to a certain degree of particularity, it should be understood that the present disclosure has been made only by way of example and numerous changes in details of construction and the combination and arrangement of components may be resorted to without departing from the scope and spirit of the present invention.

I claim as my invention:

1. A two-way shift register comprising, a plurality of NOR logic elements connected in a flip-flop chain, each of said elements being operatively connected to receive as input signals output signals from the next preceding and succeeding elements in the chain and to supply its output signals to the next preceding and succeeding elements in the chain, and control means operatively connected to each of said elements to supply clock pulses as input signals to said elements in a predetermined manner so that information may be transferred along said chain in either direction.

2. A two-way shift register logic stage operative with clock pulses comprising, at least four NOR logic elements connected in a flip-flop chain, each of said elements being operative to provide an output signal only if no input signal is applied at any input thereof, each of said elements being operatively connected to receive as input signals output signals from next preceding and succeeding elements and to supply its output signals to next preceding and succeeding elements, and control means operative to apply clock pulses as input signals to the element next preceding in the direction of information transfer the element from which information is desired to be transferred.

3. A shift register operative with clock pulses comprising, a plurality of NOR logic elements connected in a flip-flop chain, each of said elements being operative to provide an output signal only if no input signal is applied at any input thereof, each of said elements being operatively connected to receive as input signals output signals from the next preceding and succeeding elements in the chain and to supply its output signals to the next preceding and succeeding elements in the chain, and supply means operatively connected to each of said elements to apply clock pulses as input signals to said elements in a predetermined manner so that information may be transferred along said chain in either direction.

4. A shift register comprising, a plurality of NOR logic elements connected in a flip-flop chain, each of said elements being operative to provide a ONE output signal only if no ONE input signal is applied at any input thereof, each of said elements being operatively connected to receive as input signals output signals from the next preceding and succeeding elements in the chain and to supply its output signals to the next preceding and succeeding elements in the chain, and pulse supply means operatively connected to each of said elements to apply clock pulses as ONE input signals to the element next preceding in the direction of information transfer desired the element of the chain from which information is desired to be transferred.

5. A two-way shift register logic stage comprising, four NOR logic elements connected in a flip-flop chain, each of said elements being operative to provide a ONE output signal only if no ONE input signal is applied at any input thereof, each of said elements being operatively connected to receive as input signals output signals from next preceding and succeeding elements and to supply its output signals to next preceding and succeeding elements, and pulse supply means operatively connected to each of said elements and being operative to apply clock pulses as ONE input signals to the element next preceding in the direction of information transfer the element of the chain from which information is desired to be transferred.

References Cited by the Examiner

UNITED STATES PATENTS

| | | | |
|---|---|---|---|
| 3,005,917 | 10/61 | Hofmann | 307—88.5 |
| 3,067,341 | 12/62 | Kunzke | 307—88.5 |

OTHER REFERENCES

Pub. I: "Shift Register and Binary Triggers," by J. Earle in IBM Tech. Disclosure Bulletin, vol. 4, No. 5, dated October 1961, pp. 53–54.

ARTHUR GAUSS, *Primary Examiner.*